United States Patent
Greenwood et al.

(10) Patent No.: US 10,319,062 B2
(45) Date of Patent: Jun. 11, 2019

(54) RENDERING MAP DATA USING DESCRIPTIONS OF RASTER DIFFERENCES

(71) Applicant: GOOGLE INC., Mountain View, CA (US)

(72) Inventors: Benjamin Greenwood, Mountain View, CA (US); Damon Stacey, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 77 days.

(21) Appl. No.: 15/278,018

(22) Filed: Sep. 27, 2016

(65) Prior Publication Data
US 2018/0089791 A1    Mar. 29, 2018

(51) Int. Cl.
| | | |
|---|---|---|
| G06T 1/20 | (2006.01) | |
| H04L 29/08 | (2006.01) | |
| G01C 21/32 | (2006.01) | |
| G01C 21/36 | (2006.01) | |
| H04L 29/06 | (2006.01) | |

(52) U.S. Cl.
CPC .............. G06T 1/20 (2013.01); G01C 21/32 (2013.01); G01C 21/367 (2013.01); H04L 67/10 (2013.01); H04L 67/42 (2013.01); H04L 69/324 (2013.01)

(58) Field of Classification Search
CPC .......................... G09G 2340/0407; G06T 3/40
USPC ........................................................ 345/660
See application file for complete search history.

(56) References Cited

U.S. PATENT DOCUMENTS

| | | | | |
|---|---|---|---|---|
| 8,223,172 B1* | 7/2012 | Miller | ................... | G06F 3/0481 345/660 |
| 8,243,102 B1* | 8/2012 | Cornell | ................... | G06T 17/05 345/418 |
| 8,896,630 B1* | 11/2014 | Miller | ....................... | G06T 3/40 345/636 |
| 2003/0231190 A1* | 12/2003 | Jawerth | ..................... | G06T 9/00 345/660 |
| 2008/0059889 A1* | 3/2008 | Parker | ............... | G06F 17/30241 715/748 |
| 2008/0109159 A1* | 5/2008 | Shi | ......................... | G01C 21/32 701/421 |
| 2010/0017733 A1* | 1/2010 | Barros | ............. | G06F 17/30241 715/766 |
| 2010/0321399 A1* | 12/2010 | Ellren | ............... | G06F 17/30241 345/587 |

(Continued)

OTHER PUBLICATIONS

Fang et al., "A New Dynamic Tile Caching Method for WebGIS," Multimedia Technology (ICMT), pp. 1-4 (2010).

(Continued)

*Primary Examiner* — Jin Ge
(74) *Attorney, Agent, or Firm* — Marshall, Gerstein & Borun LLP

(57) ABSTRACT

A network server receives, from a client device, an indication of a first raster map image that depicts a geographic map of a certain region and a certain zoom level. The network server obtains a second raster map image corresponding to the geographic region and the zoom level and generating a description of a difference in pixels between the indicated first raster map image and the second raster map image. The network server then provides the description of the determined difference in pixels to the client device for generating the second raster map image at the client device.

20 Claims, 5 Drawing Sheets

(56) References Cited

U.S. PATENT DOCUMENTS

| | | | |
|---|---|---|---|
| 2011/0270833 A1* | 11/2011 | von Kaenel | G06F 17/30241 707/736 |
| 2012/0320089 A1* | 12/2012 | Kreft | G01C 3/08 345/629 |
| 2013/0080504 A1* | 3/2013 | Maurer | G06F 17/30241 709/203 |
| 2013/0093750 A1* | 4/2013 | Cornell | G06T 15/00 345/419 |
| 2013/0151645 A1* | 6/2013 | Siliski | G06F 17/30902 709/213 |
| 2013/0321424 A1* | 12/2013 | Pylappan | G06T 11/00 345/440 |
| 2013/0339891 A1* | 12/2013 | Blumenberg | G01C 21/26 715/771 |
| 2014/0340419 A1* | 11/2014 | Otero | G06T 9/00 345/619 |
| 2014/0340421 A1 | 11/2014 | Otero et al. | |
| 2014/0344296 A1* | 11/2014 | Chawathe | G06F 17/30241 707/755 |
| 2015/0262399 A1* | 9/2015 | Popescu | G01C 21/32 345/630 |

OTHER PUBLICATIONS

International Search Report and Written Opinion for Application No. PCT/US2017/052741, dated Oct. 27, 2017.
Ryan, "The RIM Framework for Image Processing," Advanced Concepts for Intelligent Vision Systems Lecture Notes in Computer Science, pp. 150-160 (2006).

* cited by examiner

RENDERING MAP DATA USING DESCRIPTIONS OF RASTER DIFFERENCES

FIELD OF THE DISCLOSURE

The present disclosure relates to interactive digital maps and, more particularly, to efficiently transferring changes to raster map images to client devices via communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Interactive digital maps, which various geographic applications display on computing devices, generally depict numerous geographic features, such as roads, outlines of countries and towns, bodies of water, buildings, etc. Geographic features displayed as part of a digital map can have different appearance at different levels of magnification of the digital map, commonly referred to as "zoom levels." A digital map can be made up of several tiles, or portions of a certain fixed size, typically dependent on the zoom level.

Generally speaking, map servers can provide map data to client devices as map images in raster formats, according to which map images are described in terms of pixels, or in a scalable formats that rely on mathematical descriptions of shapes (e.g., the vector graphics format). In the former case, map images are generally ready for display on client devices. In the latter case, client devices first interpret map data locally to generate raster map images, at a relatively high computational cost, and only then display these map images.

Transmitting map data in an image format generally takes up a significant amount of bandwidth. Moreover, when a new version of a raster map image illustrating a digital map becomes available, or when the server adds new information such as traffic to the digital map, the server sends a new raster map image to replace the old version.

SUMMARY

One embodiment of these techniques is a method for efficiently providing digital map data to client devices, which can be implemented in a network server. The method includes receiving, from a client device, an indication of a first raster map image that depicts a geographic map of a certain region and a certain zoom level at the client device. The method further includes obtaining, by one or more processors, a second raster map image corresponding to the geographic region and the zoom level, and generating a description of a difference in pixels between the indicated first raster map image and the second raster map image. The method also includes providing the description of the determined difference in pixels to the client device for generating the second raster map image at the client device.

Another embodiment of these techniques is method for rendering digital maps. The method includes receiving, at a client device from a network server, a first raster map image that depicts a geographic map of a certain region and a certain zoom level, at a first time, and transmitting, to the network server at a second time subsequent to the first time, an indication of the first raster map image. The method further includes receiving, from the network server, a description of a difference in pixels between the first raster map image and a second raster map image to be displayed at the client device. Still further, the method includes generating the second raster map image using the first raster map image and the description of the difference in pixels, and displaying the second raster map image at the client device.

Yet another embodiment of these techniques is a client device including processing hardware, a display device coupled to the processing hardware, and a non-transitory computer-readable memory coupled to the processing hardware. The memory stores instructions that, when executed by the processing hardware, cause the client device to: (i) receive, from a network server, a first raster map image that depicts a geographic map of a certain region and a certain zoom level, at a first time, (ii) transmit, to the network server at a second time subsequent to the first time, an indication of the first raster map image, (iii) receive, from the network server, a description of a difference in pixels between the first raster map image and a second raster map image to be displayed at the client device, (iv) generate the second raster map image using the first raster map image and the description of the difference in pixels, and (v) display the second raster map image via the display device.

DETAILED DESCRIPTION

Overview

Figure 1:
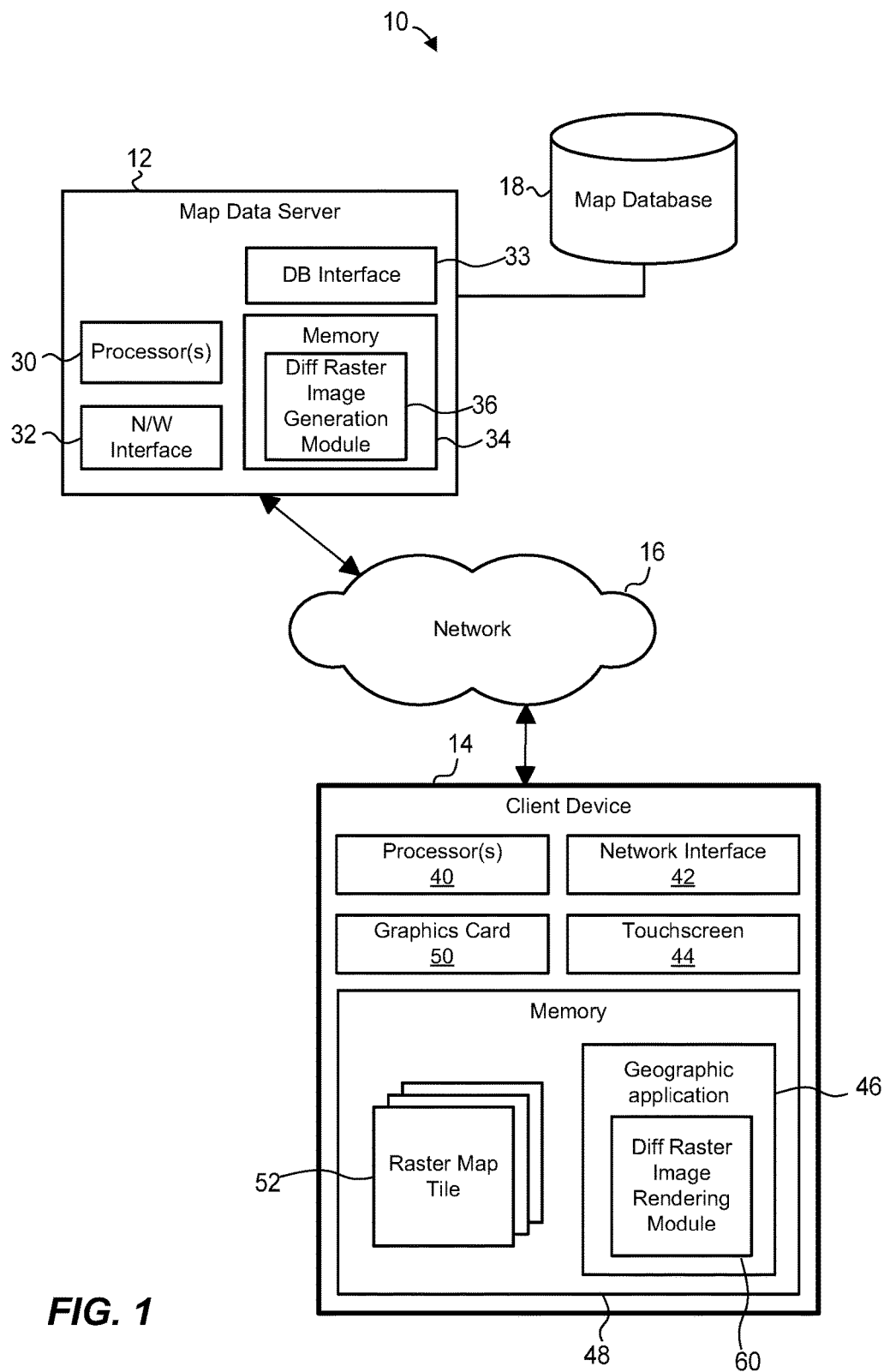
FIG. 1 is a block diagram of an example computing system in which techniques for generating map images using descriptions of raster differences can be implemented.

According to the techniques of this disclosure, a client device provides an indication of a raster map image available at the client device to a network server, for a certain geographic area and a certain zoom level. The raster map image can be a versioned raster map tile, and the indication from the client device can specify the version number of the raster map tile. More generally, the client device can provide an indication of the available raster map image by indicating the geographic area along with the level of magnification (e.g., zoom level) in any suitable manner. The client device in some cases also specifies the layers of information, such as traffic or weather, already included in the raster map image.

The indication the client device provides to the network server can include an implicit request for a new raster map image when, for example, the network server determines that a newer version of the raster map image for the same geographic area and zoom level is available. In other cases, the indication can include an explicit request for a new raster map image when, for example, the client device requests that certain layers of information be added to, or removed from, the available raster map image. Moreover, the indication can include both an implicit and an explicit request for a new map image. The client device in one example scenario indicates the availability of version $V_N$ of a certain raster map tile at the client device and requests that traffic be added to the digital map, and the network server determines that version $V_{N+1}$ of the raster map tile is available.

In any case, the network server can determine what new raster map image should be made available at the client device, and determines the difference in pixels between the new raster map image and the raster map image already available at the client device. For example, the network server can determine that the version of the raster map tile at the client device is the not the latest version of the raster map tile. The network server also can determine whether the difference between the versions is significant, e.g., whether the metric of difference exceeds a certain threshold value. To this end, the network server can retrieve pre-stored raster map tiles according to the indicated version and the new version from a database, or render these raster map tiles if needed, and compare the individual pixels in these map tiles.

The network server then can generate a description of the difference between these raster map images, and provide this description to the client device. In some implementation, the network server provides a description of the difference in the form of a "difference" raster map image (and, if tiling is used, difference map tile) to the client device. The difference raster map image can be overlaid on, or otherwise combined with, the version of the raster map image already available at the client device. The difference raster map image in an example implementation includes a transparent pixel for each pixel in the already-available raster map image that remains in the same. In a typical case, many of the pixels in the difference raster map image are transparent and identical to each other, making the difference raster map image highly compressible.

Example Computing Environment

FIG. 1 is a block diagram of an example computing system 10 in which a map data server 12 provides map data to a client device 14 via a communication network 16 for rendering an interactive digital map using the difference raster map images techniques of this disclosure. The map data server 12 is coupled to a map database 18 storing map data.

The map data server 12 can be implemented as a single device or as a group of devices. One or more of these devices can include one or more processors 30, a network interface 32, a database interface 33, and a non-transitory computer-readable memory 34 that stores instructions executable on the one or more processors 30. These instructions can implement, among other software components, a difference raster image generation module 36 that generates descriptions of difference between raster map images for use on client devices, as discussed in detail below. More generally, the map data server 12 can include any suitable type of processing hardware configured to generate map raster images of the present disclosure.

The client device 14 can be a desktop computer, a laptop computer, a tablet computer, another type of a portable device such as a smartphone, a wearable device, etc. More generally, the techniques for generating map image layers can be utilized in all suitable computing devices. The client device 14 can include a network interface 42 configured to communicate with the map data server 12 and other devices using any suitable protocols via the network 16, which can be a wide area network (WAN), a local area network (LAN), etc., and can include any suitable number of wired and/or wireless links. The client device 14 also can include a touchscreen 44 configured to receive typed and gesture-based input and to display images generated by various applications executing on the client device 14, including a geographic application 46. In other implementations, the client device 14 can include an output-only display and receive input via a keyboard, a mouse, a microphone, sensors configured to detect 2D and/or 3D gestures, etc. Further, the client device 14 can include one or more general-purpose processors 40, a non-transitory computer-readable memory 48, and a graphics card 50 (e.g., including one or more graphics processing units, or GPUs) with buffers and program memory that stores vertex and pixel shaders. The memory 48 can include persistent components (e.g., a hard disk) as well as non-persistent components (e.g., RAM). In other implementations, the client device 14 may include additional components or, conversely, not include some of the components illustrated in FIG. 1.

In the example implementation illustrated in FIG. 1, the geographic application 46 is stored in the memory 48 as a set of instructions executed by the one or more processors 40. The geographic application 46 can generate interactive digital maps and, depending on the implementation and/or scenario, obtain navigation directions, provide data related to geolocated businesses, retrieve and display geographic commercial data such as coupons and offers, etc. Depending on the implementation, the geographic application 46 can operate as a standalone application or as a component of another application such as a web browser, for example. The geographic application 46 includes a raster map image rendering module 60 that in some implementations operates on raster map tiles 52 and the difference raster images, as discussed in more detail below.

With continued reference to FIG. 1, the map database 18 can be implemented in a single storage device or multiple storage devices. The map database 18 can store map data that includes descriptions of geometry for various map features such as buildings and other structures, roads, parks, bodies of water, etc. Besides roads designed for vehicles, the map data can describe bicycle paths, pedestrian paths, railway paths, shipping routes, airlines routes, etc. Map features can be defined in a vector graphics format, according to which images are described in terms of geometrical primitives based on mathematical expressions, or another suitable scalable format. Depending on the implementation, map features can be defined in two dimensions (2D) only, in three dimensions (3D) as wireframes to which raster textures are applied, in "two-and-a-half" dimensions (2.5D) as 2D polygons "extruded" into the third dimension, etc. In some cases, map data also can include raster map images in a bitmap format, for example. Further, map data also can include text label and various forms of metadata such as links to remote resources.

Further, the map data server 12 can organize and serve map data to client devices using map tiling. Map tiles generally correspond to 2D organization of geospatial data into a quadtree. Each tile at a given zoom level is divided into four tiles at the next level up to the highest level of magnification. Similarly, 3D organization of geospatial data can be implemented using octrees, in which a cubic volume contains map geometry at a certain zoom level and is subdivided into eight cubic volumes at the next zoom level, with each of the eight cubic volumes typically containing a more detailed map geometry. To map the surface of the Earth onto a plane for 2D representation, Mercator or another suitable projection can be used. Although the examples below refer to map data organized into 2D map tiles, the LOD and style parameter determination techniques of this disclosure can be extended to 3D map data organized into octrees.

Unless stated otherwise, the term "map tile" in the discussion below refers to a raster map tile, i.e., an image defined in terms of pixels rather than vectors or other non-pixel indicators. For ease of explanation, the discussed below primarily concerns raster map tiles. It is noted, however, that the techniques of this disclosure can be applied to any suitable raster map images.

Figure 2:
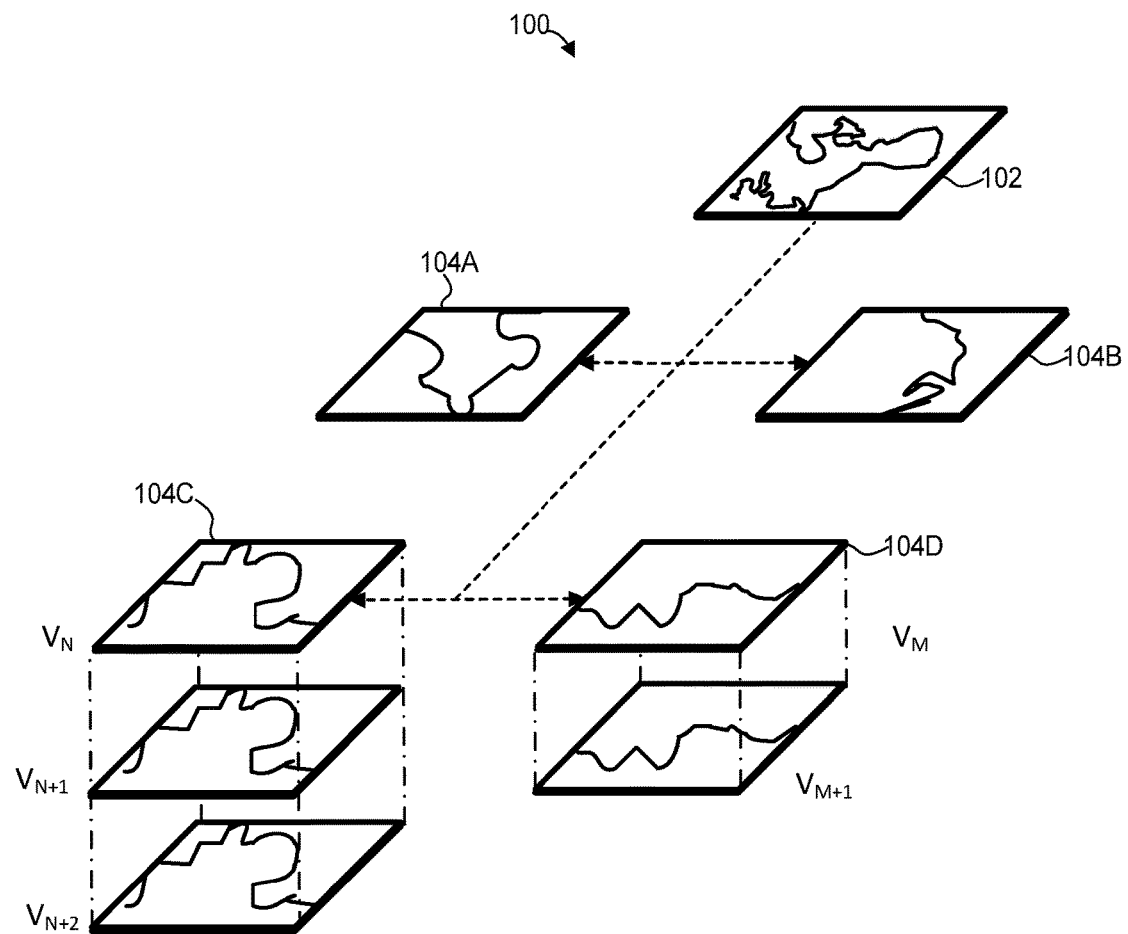
FIG. 2 is a conceptual diagram that illustrates a portion of a quadtree into which raster map tiles can be organized in the system of FIG. 1, with some of the raster map tiles including multiple versions.

FIG. 2 schematically illustrates a fragment of a quadtree 100 into which raster map tiles can be organized. The fragment includes a raster map tile 102 of a geographic area R at a discrete zoom level $Z_N$. The four raster map tiles 104A-D collectively cover the geographic area R at the next area of magnification, i.e., discrete zoom level $Z_{N+1}$. More specifically, the raster map tile 104A covers the northwest quadrant of the raster map tile 102, the raster map tile 104B covers the northeast quadrant of the raster map tile 102, the raster map tile 104C covers the southwest quadrant of the raster map tile 102, and the raster map tile 104D covers the southeast quadrant of the raster map tile 102. The raster map tiles 102 and 104A-D can be stored in the map database 18, with the relationships between these raster map tiles indicated by appropriate links or indices, for example.

As illustrated in FIG. 2, there are three versions of the raster map tile 104C: $V_N$, $V_{N+1}$, and $V_{N+2}$, and two versions of the raster map tile 104D: $V_M$ and $V_{M+1}$. In some embodiments, the map database 18 stores these multiple versions for the raster map tiles 104C and 104D. The map data server 12 can use unique identifier to retrieve not only a raster map tile corresponding to the desired geographic area and the desired zoom level, but also a particular of the raster map tile. In other words, versions $V_M$ and $V_{M+1}$ of the raster map tile 104D can have separate, unique identifiers. In other embodiments, the map database 18 stores only the latest versions of these raster map tiles but also stores information that allows the difference raster image generation module 36 to reconstruct prior versions of these raster map tiles.

The map data server 12 can generate new versions of raster map tiles in response to various changes to geographic features in the real world or due to the improvements in map data quality, for example. Further, where raster map tiles reflect dynamic information, such as road closures, store hours, traffic, etc., the map data server 12 can generate new versions of raster map tiles relatively often.

Efficiently Rendering Digital Maps Using Raster Map Images

In example operation, the client device 14 provides an indication of the raster map tile 52 available to the geographic application 46. As a more specific example, the user of the client device 14 can request that the viewport, defining the currently visible portion of the interactive digital map, be repositioned in accordance with a gesture or another type of user input. The geographic application 46 in response can determine that the repositioned viewport now covers the raster map tile 52, possibly along with other raster map tiles. The client device 14 can indicate that the raster map tile 52 has identifier I (which in turn can indicate that the map tile 52 is centered at (X, Y) and has the zoom level $Z_i$) and version $V_M$.

The difference raster image generation module 36 in response to the received indication queries the database 18 to determine that a newer version $V_N$ of the raster map tile 52 is available, where N>M, in the example operation. The module 36 determines the difference between the versions $V_M$ and $V_N$, generates a difference raster map tile, compresses the difference raster map tile to reduce bandwidth usage, and transmits the difference raster map tile to the client device 14. The geographic application 46 un-compresses the difference raster map tile upon receipt and overlays the difference raster map tile over version $V_M$ of the map tile 52 to effectively generate version $V_N$ of the map tile 52. The geographic application 46 also can replace version $V_M$ of the map tile 52 in the memory 48 with the newer version $V_N$ of the map tile 52.

Figure 3:
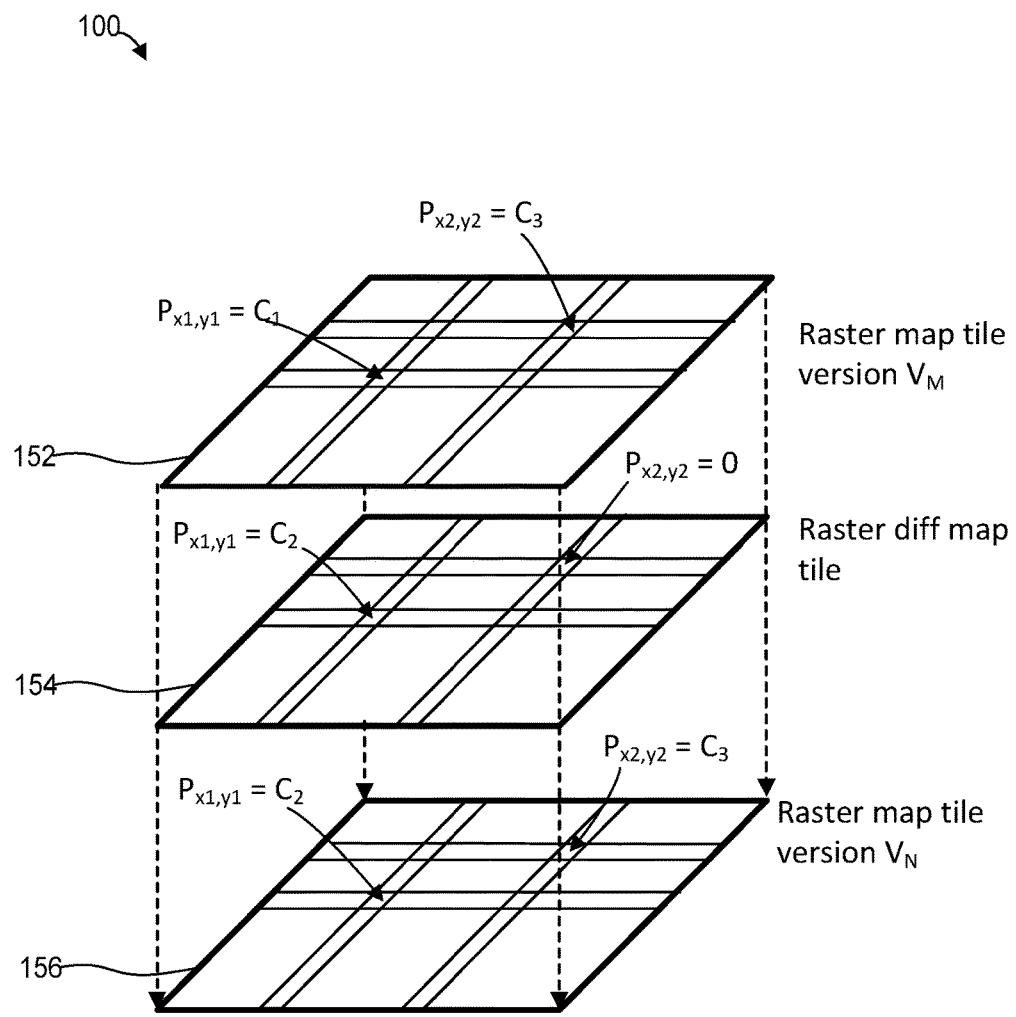
FIG. 3 is a diagram that illustrates generating a map image for a certain geographic area using a raster map image and a difference raster map image, which can be implemented in the system of FIG. 1.

For clarity, a diagram 100 of FIG. 3 illustrates a combination of an example raster map tile 152 with a difference raster map tile 154 to generate a raster map tile 154. The raster map tile 152 in this example is version $V_M$, and the raster map tile 156 is version $V_N$, with N>M. In other words, version N is more up-to-date than version M. It is noted that versions N and M need not be adjacent, and that in general there can be one or several intermediate versions between versions N and M.

As the diagram 100 illustrates, example pixel $P_{x1,y1}$ in the raster map tile 152 has the color value $C_1$, whereas the same pixel $P_{x1,y1}$ in the raster map tile 156 has the color value $C_2$. The difference raster map tile 154 accordingly stores the value $C_2$ in pixel $P_{x1,y1}$. On the other hand, example pixel $P_{x2,y2}$ in the raster map tile 152 has the color value $C_3$, and the same pixel $P_{x2,y2}$ in the raster map tile 156 has the same color value $C_3$. The difference raster map tile 154 accordingly stores the value 0, or some other value indicating transparency, in pixel $P_{x2,y2}$. The difference raster map tile 154 often includes a large number pixels with the same value indicating transparency, with many of these pixels defining contiguous regions of same-value pixels. These large regions allow the difference raster map tile 154 to be efficiently compressed.

Referring back to FIG. 1, the difference raster image generation module 36 can use the raster map tiles 152 and 156 to generate the difference raster map tile 154, and the raster map image rendering module 60 can use the raster map tile 152 along with the difference raster map tile 154 to generate the raster map tile 154.

More specifically, the module 36 can obtain the raster map tiles 152 and 156 and compare pairs of pixels in the same position (i, j) in these two raster map tiles. In some implementations, the module 36 can simply determine whether pixel $P_{i,j}$ in the raster map tile 152 has the same exact value as pixel $P_{i,j}$ in the raster map tile 156, and accordingly select either the pixel $P_{i,j}$ from the raster map tile 156 or a transparent color value for inclusion in the difference raster map tile 154. In another implementation, the module 36 can evaluate each of the R (red), G (green) and B (blue) channels of the pixels separately, and weigh the difference in any suitable manner. Thus, the module 36 can compare the value in the R channel of one pixel to the value of the R channel in another pixel, compare value of G channel of one pixel to the value of the G channel in another pixel, etc. In yet another implementation, the module 36 can determine the vector distance between two different colors $C_1$ and $C_2$ in pixels $P_{x1,y1}$ of the two raster map tiles, for example. The vector distance can be understood as the distance between points $(x_1, y_1, z_1)$ and $(x_2, y_2, z_2)$, where $x_1$ and $x_2$ are the values of the R component of $C_1$ and $C_2$, respectively; $y_1$ and $y_2$ are the values of the G component of $C_1$ and $C_2$, respectively; and $z_1$ and $z_2$ are the values of the B component of $C_1$ and $C_2$, respectively.

Further, the difference raster image generation module 36 in some implementations determines whether the difference between a pair of pixels exceeds a certain threshold value $D_{TH}$. When the difference does not exceed the threshold value $D_{TH}$, the module 36 assigns the transparent color value to the corresponding pixel in the difference raster map tile. The module 36 can compare the vector distance between the colors of two pixels to the threshold value $D_{TH}$, or compare each of the channel-specific differences to the threshold value $D_{TH}$, to determine whether any of the R, G and B channel differences exceeds the threshold value $D_{TH}$. More generally, the module 36 can apply the threshold value $D_{TH}$ in any suitable manner.

The difference raster image generation module 36 in some implementations uses another threshold value $T_{TH}$ to determine whether a sufficiently large number of pixels in two raster map tiles is different, so as to determine whether the module 36 should generate and send a difference raster map tile. The threshold value $T_{TH}$ can be defined in absolute terms for the entire raster map tile, e.g., the module 36 generates a difference raster map tile if the number of changed pixels≥$T_{TH}$. As one alternative, the threshold value $T_{TH}$ can define the percentage of the changed pixels in the raster map tile. As yet another alternative, the threshold value $T_{TH}$ can define the number of density of changes in pixel values, so that the model 36 generates a difference raster map tile when the different pixels are concentrated in one portion of the raster map tile, but does not generate a difference raster map tile when the same number of different pixels is distributed more evenly through the raster map tile. Still another alternative includes comparing raster map tiles on a segment-by-segment basis to determine whether any of the segments in a raster map tile are sufficiently different from the corresponding segment in the newer version of the raster map tile.

Example Methods for Generating and Applying Difference Raster Images

For further clarity, some of the techniques for generating and applying difference raster images are discussed next with reference to the flow diagrams of FIGS. 3 and 4. These flow diagrams illustrate methods that can be implemented as sets of instructions stored on a computer-readable medium and executable on one or more processors. The method of FIG. 4 can be implemented in the server 12, and the method of FIG. 4 can be implemented in the client device 14, for example. However, these or similar methods also can be implemented in other suitable devices.

Figure 4:
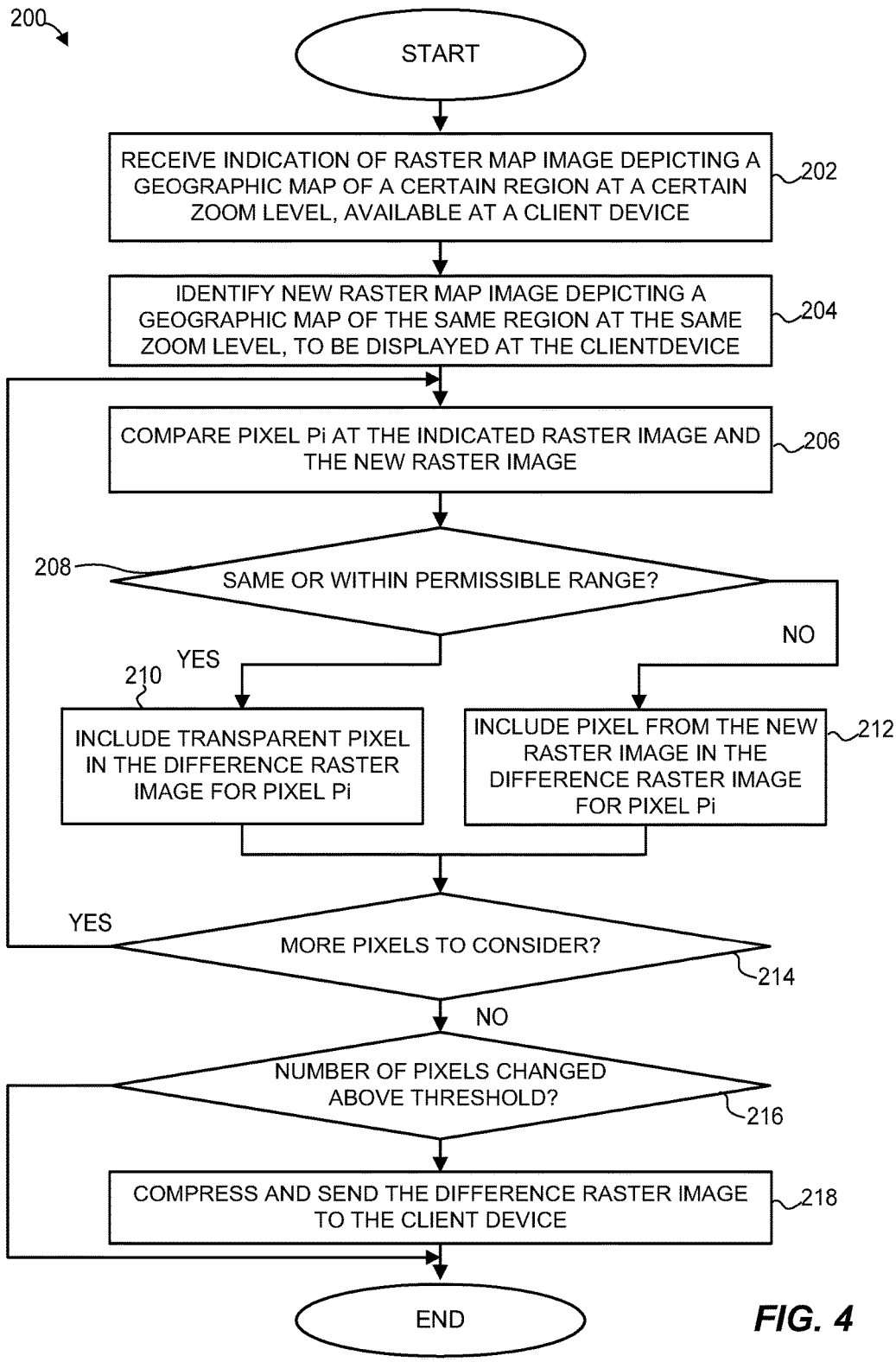
FIG. 4 is a flow diagram of an example method for generating a difference raster map image, which can be implemented in the map server of FIG. 1.

Referring first to FIG. 4, a method 200 can be implemented in the difference raster image generation module 36 discussed above, for example, or another suitable module or a group of communicatively interconnected modules. The method 200 begins at block 202, where an indication of a raster image available at a client device is received. The raster image depicts a geographic map of a certain region at a certain zoom level. If map tiling techniques outlined above are used, the indication received at block 202 can include the unique identifier of the raster map tile in the map database 18 (e.g., ID="3452323590"). In addition to identifying the geographic region covered by the raster map tile and the zoom level, the identifier can indicate the version of the raster map tile. The identifier in another embodiment indicates the date on which the raster map tile was cached at the client device, which the map server can use to determine what image the raster map tile contains. Further, the indication received at block 202 in some scenarios identifies one or more layers of information added the "base" raster map tile. These layers of information can include traffic, public transportation routes, weather, etc. Still further, the indication can specify that certain markers were or other graphic elements were added to the base raster map tile to depicts search results, for example.

In general, the indication received at block 202 can include any suitable parameter or a combination of parameters that the map server can use to unambiguously determine the content of the raster map image available at the client device.

At block 204, a new raster map image of the same geographic area at the same zoom level is identified. The new raster map image can correspond to a new version of a raster map tile specified at block 202, for example. In another scenario, the new raster map image corresponds to the same version of the raster map tile, but includes a new layer of information. The new raster map image also correspond to a layer of information being removed from the raster map image available at the client device. The new raster map image can be retrieved from a database or generated at the map server, if necessary.

Next, the individual pixels of the raster map image already available at the client device and the new raster map image are compared at blocks 206-214. In particular, a pair of pixels $P_i$ in the same position in the two raster map images are selected at block 206. If the difference in the values of these two pixels is within a certain permissible range (or non-existent), the flow proceeds to block 210, where a transparent pixel is generated in the difference raster image at the shared position of the pixels $P_i$. Otherwise, the flow proceeds to block 212, where the pixel from the new map image is included in the difference raster image at the shared position of the pixels $P_i$. If more pixels to compare still remain (block 214), the flow returns to block 206.

At block 216, the number of non-transparent pixels in the difference raster map image is compared to a threshold value. If the number exceeds the threshold value, the difference raster map image is transmitted to the client device at block 218. In some embodiments, the difference raster map image is compressed prior to transmissions. Because the difference raster map image typically contains a large number of transparent pixels in contiguous blocks, the difference raster map image is highly compressible. The method ends after block 218. If the number does not exceed the threshold value, the method 200 completes after block 216.

Figure 5:
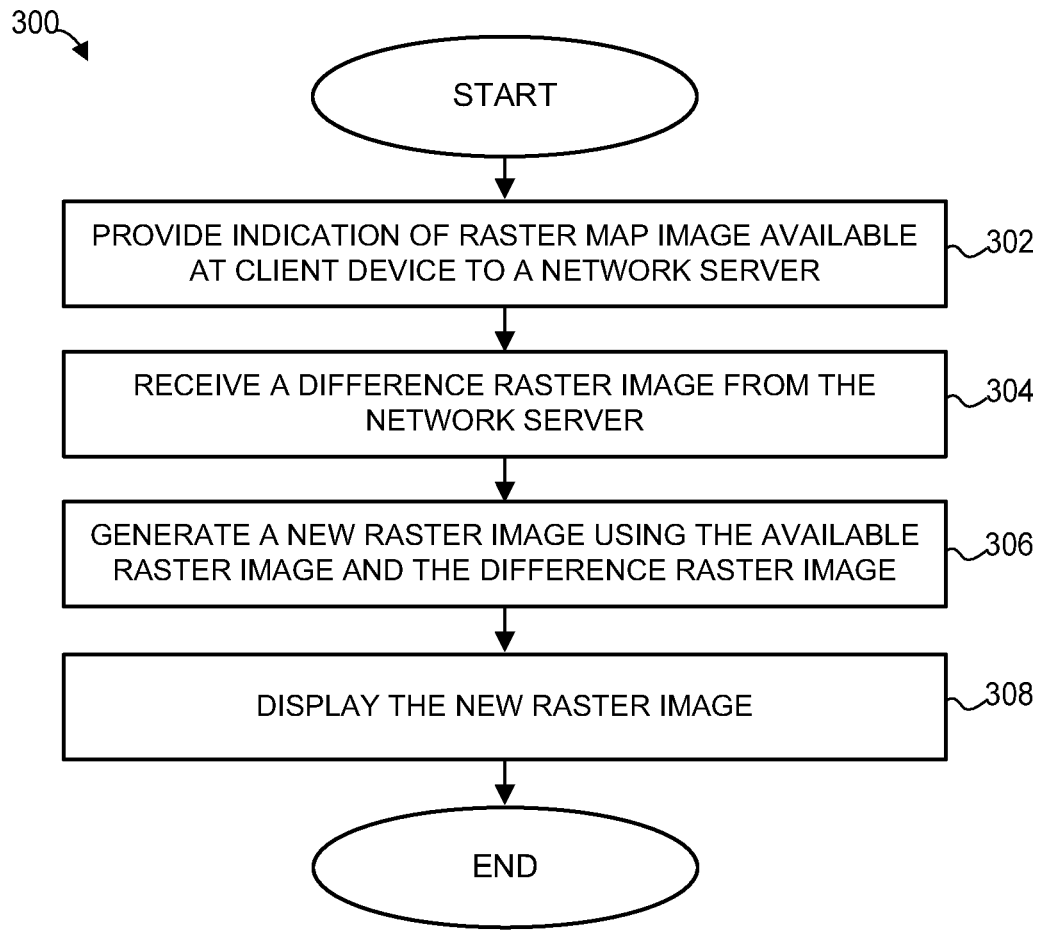
FIG. 5 is a flow diagram of an example method for generating an updated map image using an initial raster map image and a difference raster map image, which can be implement in the client device of FIG. 1.

FIG. 5 is a flow diagram of an example method 300 for generating an updated map image using an initial raster map image and a difference raster map image, which can be implement in the client device 14 of FIG. 1 or another suitable device.

The method 300 begins at block 302, where an indication of a raster map image available at the client device is provided to the network server. As discussed above, the indication can include, or be accompanied by, an implicit or explicit request for an updated raster map image. The implicit request can be simply indicate the version of the raster map tile which the client device already stores in its local memory. The client device can generate this implicit request when the viewport is repositioned over the interactive digital map, for example, or according to a certain schedule of auditing raster map tiles cached in the local memory (e.g., after a certain raster map tile has been stored in the local memory for more than X days). On the other hand, an explicit request can indicate that the user wishes to see an additional layer of information, a marker at a certain location, etc.

At block 304, the difference raster image is received from the network server. The difference raster image may be compressed. A typical difference raster image includes transparent pixels as well as non-transparent pixels to be displayed over the corresponding pixels in the raster map image already available at the client device. In some cases, an indication that no difference raster image is required or available is received at block 304, in which case the method ends after block 304.

In other implementations, a description of the difference between the new raster map image and the raster map image available at the client device has a format other than a difference raster map image. For example, the description of this difference can be a list of pixel coordinates and new values: $((x_1, y_1, C_1), (x_2, y_2, C_2), \ldots (x_N, y_N, C_N))$.

Next, at block 306, a new raster map image is generated by layering the difference raster image over the raster map image available at the client device. To this end, any suitable image layering techniques can be used. The resulting raster map image is displayed via a user interface at block 308.

Additional Considerations

Generally speaking, the techniques of this disclosure can be implemented portable devices, non-portable devices, standalone navigation systems, navigation systems built into head units of vehicles, wearable devices, etc. Further, these techniques in general are applicable to both outdoor and indoor maps. Still further, although the examples above referred primarily to the geographic application 46, these techniques similarly can be implemented in an application programming interface (API) which other software applications, such as web browsers, can invoke.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the system 100 for alignment of visual indicators on navigational maps and mapping system 700 in a mapping system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for using difference raster images. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for rendering digital maps, the method comprising:
receiving, at a client device from a network server, a first raster map image that depicts a geographic map of a certain region and a certain zoom level, at a first time;
transmitting, to the network server at a second time subsequent to the first time, an indication of the first raster map image;
receiving, from the network server, a description of a difference in pixels between the first raster map image and a second raster map image to be displayed at the client device, including receiving a difference raster map image that includes (i) transparent pixels for pixels in the first raster map image with a difference relative to corresponding pixels in the new second map image below a threshold value, and (ii) non-transparent pixels for pixels in the first raster map image with a difference relative to corresponding pixels in the new second map image at or above the threshold value;
generating the second raster map image using the first raster map image and the description of the difference in pixels, including layering the difference raster map over the first raster map image; and
displaying the second raster map image at the client device.

2. The method of claim 1, further comprising:
transmitting to the network server an indication of a data layer to be added to, or removed from, the first raster map image at the client device to generate the second raster map image.

3. The method of claim 1, wherein the first raster map image corresponds to a versioned map tile, and wherein transmitting the indication of the first raster map image includes transmitting a version number of the map tile.

4. The method of claim 1, wherein transmitting the indication of the first raster map image includes transmitting an indication of the region and the zoom level.

5. The method of claim 2, wherein the indication of the data layer to be added to, or removed from, the first raster map images corresponds to one of (i) traffic, (ii) public transportation routes, or (iii) weather.

6. The method of claim 3, wherein the second raster map image corresponds to a latest version of the map tile.

7. The method of claim 1, further comprising un-compressing the difference raster image.

8. The method of claim 1, wherein transmitting the indication of the of the first raster map image includes transmitting a unique identifier of the first raster map image in a map database.

9. A client device comprising:
processing hardware;
a display device coupled to the processing hardware; and
a non-transitory computer-readable memory coupled to the processing hardware, the memory storing instructions that, when executed by the processing hardware, cause the client device to:
receive, from a network server, a first raster map image that depicts a geographic map of a certain region and a certain zoom level, at a first time,
transmit, to the network server at a second time subsequent to the first time, an indication of the first raster map image,
receive, from the network server, a description of a difference in pixels between the first raster map image and a second raster map image to be displayed at the client device, including receive a difference raster map image that includes (i) transparent pixels for pixels in the first raster map image for pixels in the first raster map image with a difference relative to corresponding pixels in the new second map image below a threshold value, and (ii) non-transparent pixels for pixels in the first raster map image with a difference relative to corresponding pixels in the new second map image at or above the threshold value;
generate the second raster map image using the first raster map image and the description of the difference in pixels, including layer the difference raster map over the first raster map image and
display the second raster map image via the display device.

10. The client device of claim 9, wherein the instructions further cause the client device to transmit to the network server an indication of a data layer to be added to, or removed from, the first raster map image at the client device to generate the second raster map image.

11. The client device of claim 9, wherein the first raster map image corresponds to a versioned map tile, and wherein to transmit the indication of the first raster map image, the instructions cause the computing device to transmit to the network server a version number of the map tile.

12. The client device of claim 9, wherein the instructions cause the computing device to transmit to the network server an indication of the region and the zoom level.

13. The client device of claim 10, wherein the indication of the data layer to be added to, or removed from, the first raster map images corresponds to one of (i) traffic, (ii) public transportation routes, or (iii) weather.

14. The client device of claim 11, wherein the second raster map image corresponds to a latest version of the map tile.

15. The client device of claim 9, wherein the instructions further cause the client device to un-compress the difference raster image.

16. The client device of claim 9, wherein transmitting the indication of the of the first raster map image includes transmitting a unique identifier of the first raster map image in a map database.

17. A client device comprising:
processing hardware;
a display device coupled to the processing hardware; and
a non-transitory computer-readable memory coupled to the processing hardware, the memory storing instructions that, when executed by the processing hardware, cause the client device to:
receive, from a network server, a first raster map image that depicts a geographic map of a certain region and a certain zoom level, at a first time,
transmit, to the network server at a second time subsequent to the first time, an indication of the first raster map image,
receive, from the network server, a description of a difference in pixels between the first raster map image and a second raster map image to be displayed at the client device, including receive a difference raster map image that includes pixels generated by comparing, at the network server, pixels at certain positions within the first raster map image to pixels at the same positions within a new raster map image to determine whether a difference in color exceeds a threshold value, including comparing each of Red, Green, and Blue channels separately, the difference raster map image including transparent pixels for pixels in the first raster map image that remain the same;
generate the second raster map image using the first raster map image and the description of the difference in pixels, including layer the difference raster map over the first raster map image and
display the second raster map image via the display device.

18. The client device of claim 17, wherein the instructions further cause the client device to transmit to the network server an indication of a data layer to be added to, or removed from, the first raster map image at the client device to generate the second raster map image.

19. The client device of claim 17, wherein the first raster map image corresponds to a versioned map tile, and wherein to transmit the indication of the first raster map image, the instructions cause the computing device to transmit to the network server a version number of the map tile.

20. The client device of claim 17, wherein the instructions cause the computing device to transmit to the network server an indication of the region and the zoom level.

* * * * *